P. W. DALRYMPLE.

TREAD.

APPLICATION FILED FEB. 20, 1922.

Reissued Sept. 26, 1922.

15,458.

2 SHEETS—SHEET 1.

Inventor:
Philip W. Dalrymple

By Dodge and Sons,

Attorneys.

P. W. DALRYMPLE.

TREAD.

APPLICATION FILED FEB. 20, 1922.

Reissued Sept. 26, 1922. 15,458.

2 SHEETS—SHEET 2.

Inventor:
Philip W. Dalrymple,

By Rodgers and Evans

Attorneys.

Reissued Sept. 26, 1922. Re. 15,458

UNITED STATES PATENT OFFICE.

PHILIP W. DALRYMPLE, OF BALTIMORE, MARYLAND, ASSIGNOR TO LEWIS K. DAVIS, OF WASHINGTON, DISTRICT OF COLUMBIA.

TREAD.

Original No. 1,347,253, dated July 20, 1920, Serial No. 289,707, filed April 12, 1919. Application for reissue filed February 20, 1922. Serial No. 537,744.

*To all whom it may concern:*

Be it known that I, PHILIP W. DALRYMPLE, a citizen of the United States of America, residing in the city of Baltimore, State of Maryland, have invented certain new and useful Improvements in Treads, of which the following is a specification.

This invention relates to a vehicle tread having the advantages that the tread pressure is equalized without regard to the variations of the supporting surface and full traction by each tread member is maintained, it accommodates itself absolutely to all irregularities of the surface traversed without appreciably raising or lowering the main body of the vehicle and without important change of level or attitude of the vehicle, due to such irregularities, which are to be distinguished from general changes of contour, encountered in ascending and descending steep inclines.

The mechanism is of the belt type, having a plurality of feet moved in a continuous path by an endless belt or chain member. These feet are mounted each on a separate frame or leg, one for each foot or traction member, and in addition to the driving means, each such leg or frame is controlled by means imparting to the tread a combination of rigid and flexible resistance by which the weight of the vehicle is supported and distributed, and uniformity of pressure on the feet or traction members, in contact with the surface being traversed, is attained without regard to even the most abrupt irregularities.

To this end the individual frames or legs controlling the feet are not only carried in contact with a rigid guide on a fixed continuous path, but are also controlled as to their position relatively to said path and guide by a flexible distributing belt which engages each leg at a point spaced from the point on that leg engaged by the guide so that it imparts to the leg a tendency to swing relatively to the guide into the position in which it engages the road and supports its share of the weight, i. e., the feet in a position to engage the road have a uniform tendency to swing downward so that each will support the same weight, and as any foot is forced upward from this lowermost position by encountering a projection on the road, it imparts to this flexible member or belt, a temporary increase of tension which has the effect of forcing or tending to force the other feet, which are likewise in position to engage the road, downward, so that they raise the whole machine slightly, causing it to proceed at an elevation corresponding to the average elevation of the ground under it, without being unduly thrown up from or dropped below its course by abrupt irregularities of surface.

A vehicle equipped with this type of tread can be driven over a very rough road bed or in open, rough or soft country where there is no road, at a fair rate of speed with a minimum effort and without serious shock to the vehicle or its load, and it can be used under these circumstances either for carrying, towing or plowing, or other farm work.

The drawings show a single pair of closed tracks or guides. In the vehicle equipped with the tread, there is such a pair of tracks on each side of the machine, the two pairs being situated in vertical parallel planes. Rollers attached to each leg run on the tracks or guides and are moved over these tracks and maintained in their relative spacing by cables which run over sheaves at the ends of the elongated loops formed by the tracks or guides. Each leg has a set of pulleys, in addition to the rollers bearing on the tracks or guides, the pulleys being engaged by the tension cable or cables. The tension pulleys are spaced from the axis of the leg, which is also the axis of the track following roller, and in normal position of each leg when its foot is in contact with the ground, the tension roller is almost directly over the foot, so that the thrust applied by the tension cable is effective directly downward against the support, the legs being pivoted in the axis of the track following rollers and controlled by the cables which impart downward thrust to them when they are in contact with the bearing surface, the thrust being equal in the instance of each foot which is in operative position.

The vehicle runs on rollers supported by stationary feet and engaging a smooth track, the feet being arranged to compensate all irregularities in the roadway and the weight being equally distributed over all the feet which are in bearing or supporting position, so that uneven roadways and broken ground are no obstacle to the transportation of great weights; and the distribution of the load on the road bed lessens the wear and tear on the surface. The power required is the minimum because of the distribution of the weight over a number of points of support with an equal and hence small load on each point of support, and the correspondingly slight depression of the ground, and because dissipation of energy on account of shocks and jars is also eliminated. The necessity of using cushioning means in the form of springs or tires is at the same time dispensed with.

Referring to the drawings,—

Figure 1:
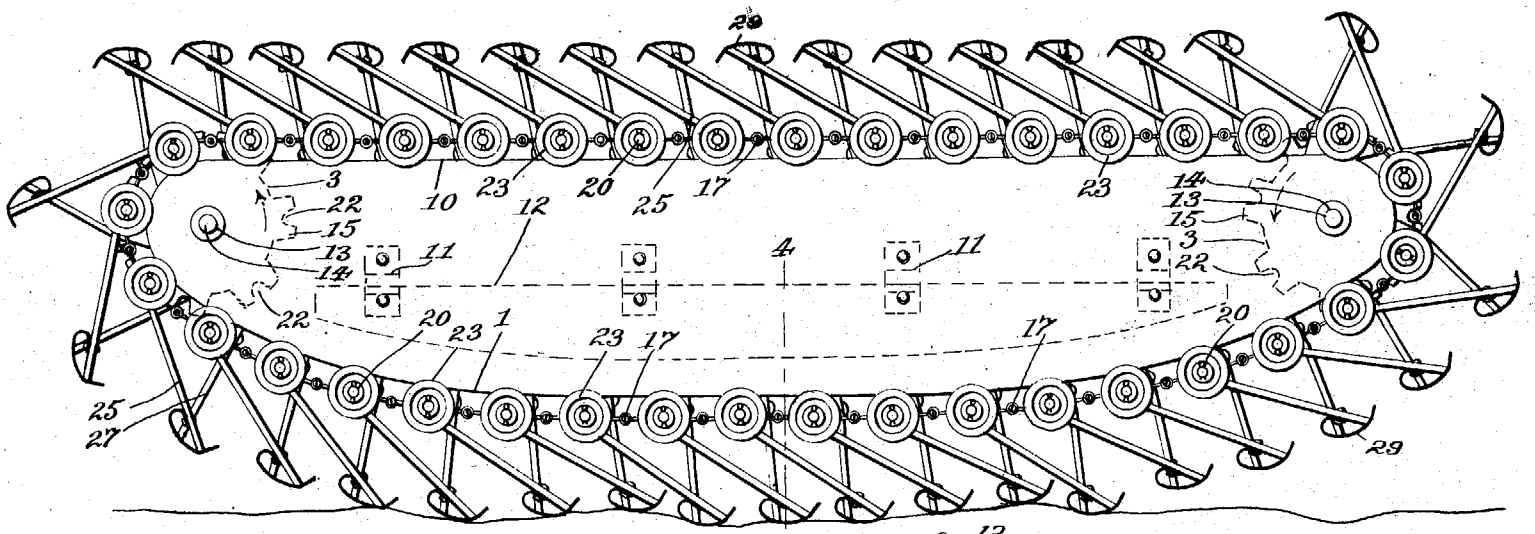
Figure 1 is a side elevation of the tread as applied to one side of the vehicle.
Figure 2:
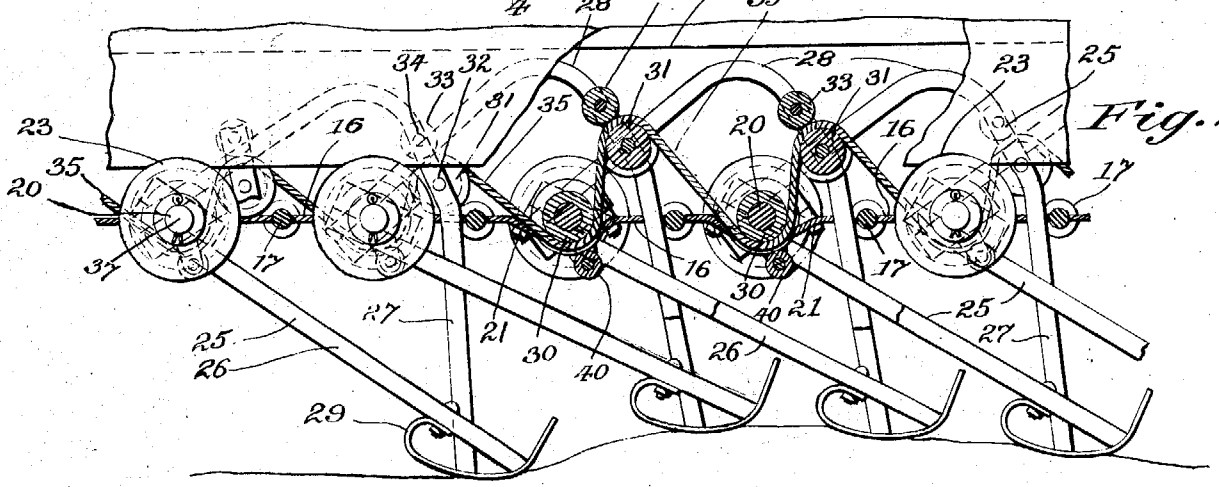
Fig. 2 is a detail of a portion of the same with parts broken away for convenience of illustration.

Referring to the drawings by numerals, the illustration relates to a single tread with the cooperating parts to be applied to one side of a vehicle or tractor, it being understood that both sides of the vehicle are similarly equipped in this regard; in other words, the illustration corresponds to one driving wheel of a vehicle as an automobile, the logical, if not the essential arrangement being that the other side of the machine be similarly equipped.

Figure 4:
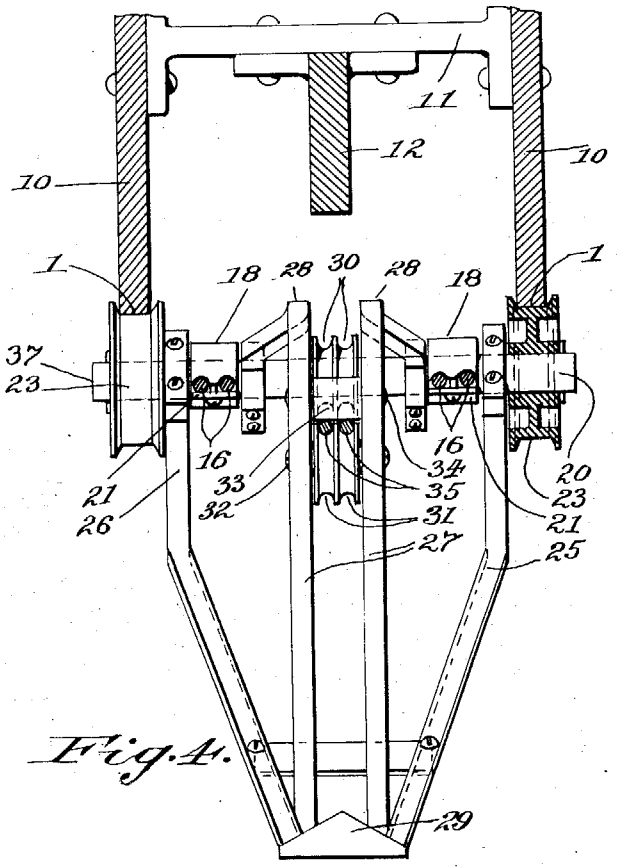
Fig. 4 is a section through the frame as on the line 4, 4, Fig. 1, showing one of the leg and foot members in elevation approximately in the attitude in which it is shown in Fig. 3.
Figure 5:
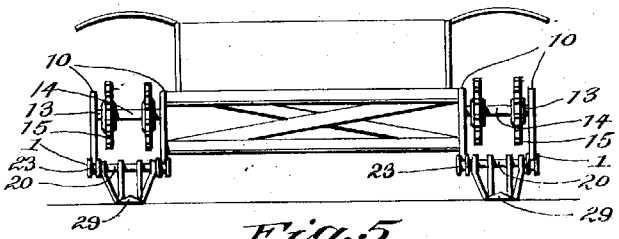
Fig. 5 is a diagrammatic end view.

Referring particularly to Figs. 1 and 4, the illustration includes two parallel tracks or guiding members 1, which in the device illustrated, are formed on the peripheral edges of two parallel vertical plates 10. These plates are maintained is rigid relation by transverse braces 11 which also support, intermediately of the plates, a limiting or stop guide 12. The plates 10 and more particularly the tracks 1 carried thereby, are of horizontally elongated shape, being provided near each end with a suitable bearing 13 for a horizontal transverse shaft 14. The ends of the track adjacent these shafts are formed on circular arcs concentric with the shafts, and one or both shafts, preferably the rear shaft 14, is suitably driven from the source of power with which the vehicle, whatever it may be, is equipped, the driving means and source of power not being shown.

Mounted on each shaft 14 between the plates 10 and suitably spaced from each plate, as hereinafter described, are two sprockets 15, such of these sprockets as are to be used for driving purposes being rigidly secured to their shafts, the front and rear sprockets on each side being in alinement. Over each sprocket is passed a belt, chain or cable 16. In the present instance, see particularly Fig. 4, this is a double cable, that is, two parallel cables side by side, provided at intervals with bar-links 17 secured thereto for engagement by the sprocket teeth, and the sprockets are suitably grooved and notched or toothed to receive the same. Between the bar-links 17 which as shown span the two cables of which each single belt is composed, are bearing blocks 18, similarly spanning the cables of each belt. Each block includes a bearing for a transverse shaft 20 which shafts are carried by corresponding blocks of the two belts, the shafts extending from the outside of one plate 10 to the outside of the other plate 10. To each block the cables forming the corresponding belt are secured by means of clamping bars 21. Both the cross-bars 17 and the blocks 18 cooperate with the sprockets 15, the peripheral surfaces of which are provided with transverse notches 22 to receive the corresponding links 17 and chambers 3 for blocks 18. The links 17 are engaged by the notches 22 to drive the belts, and chambers 3 are preferably made to admit the blocks 18 with a considerable clearance so the blocks, or rather the wheels 23 (which are preferably flanged) on their respective shafts are free to follow the track 1. Such flanging, as will be appreciated, prevents lateral shifting of the wheels and allied parts with reference to the track. The shafts 20, referred to hereinafter as the wheel shafts, are provided each with two rollers or wheels 23, one near each end of the shaft and mounted to roll upon and follow corresponding tracks 1 on the peripheries of the plates 10. These rollers should rotate freely on the shafts. Each shaft 20 also carries a corresponding frame or leg 25. Each such frame or leg consists of radial or traction arms 26 and tangent or supporting arms 27. Seen in elevation from either end of the machine, the traction arms 26 are spaced apart at the shaft by a distance equal to the distance between the inner faces of the rollers from which point they extend parallel for a little less than half their length, when they converge to their extremities at an angle of about 30°, where they are spaced in the form of the machine shown by a distance a little more than a third of that separating their upper extremities. The tangent and supporting arms 27 of each leg are also connected at one end to the corresponding shaft 20 from which, considering the legs in bearing positon as hereinafter described, they extend backward at an angle of preferably from 60 to 90° with the radial or traction arms 26 for a distance equal to about two-thirds the length of the latter, at which point they are bent backward at any preferred curve or angle, crossing the radial or traction arms near their extremities. The portion of each supporting arm beyond the curve is substantially tangent to an imaginary arc drawn about the shaft at this point. Looking at the frame in front or rear elevation, i. e., in the direction of the length of the machine, these arms are joined to the shaft, each immediately on the inner side of one of the blocks 18 from which point they converge toward the bend 28 until they are spaced by about one-half the original distance, from which point to their extremities they are shown as parallel. Near their lower extremities they cross the radial or traction arms 26 to which they are secured by a foot plate 29 which is bent around the ends of the arms or members and given a shape considered most suitable to the best result in bearing, power, traction, etc.

In addition to the rollers or wheels 23, each shaft 20 carries intermediate of the arms 27, two grooved pulleys 30. These pulleys are alined with the space between the parallel portions of the bearing or tangent members 27. The tangent members or arms 27 also carry just beyond the curve 28, between the parallel portions of these arms and on the tangent portion, two grooved guide pulleys 31 mounted on a pin or journal 32 which extends through both arms or is otherwise secured, and cooperating with these pulleys is a suitable bearing roller 33 also mounted between the arms on a suitable pin 34.

The feet and legs are carried by the cable belts 16 about the track 1 in counter-clockwise direction as viewed in Fig. 1, the position of a point in each leg 25 in alinement with the axis of a shaft 20 being determined by contact of the wheels or rollers 23 with the tracks 1. This is what is termed the rigid element of the control or actuation of these arms.

In addition to the cable belt 16, the tread includes another belt or pair of cables 35, which, referring to the legs of feet which are in contact with the ground, are passed under the pulleys 30 on the shafts 20 and over the pulleys 31 on the tangent portion of the supporting arms of the frame. This is the distributing member or supporting belt which imparts the flexible element to the resistance by which the weight of the vehicle is distributed and applied uniformly to the different feet or traction members in contact with the surface being traversed. It will be noted that as illustrated, the top or return portion of the track is flat, straight and tangential with the circular ends, so that the feet in returning extend no farther into the machine than is necessary to accomplish the result. The bottom portion of the track is shown as curved upward at the ends to bring the feet gradually into contact with the road and to raise them gradually and practically flat centrally, as no change of level at this point is desirable. The applicant's invention is not, however, limited to any particular shape of the track. The limiting guide or stop 12 is intended to contact with the retaining rollers 33 to limit the swing of the legs and to prevent the feet from being jammed or broken by contact with each other or with the cable or pulleys, and to prevent breaking of the cable, etc. The manner of operation of this guide is apparent. When any leg has reached the limit of its swing, the roller 33 carried thereby, engages the rigid track 12 which is placed only above the rollers in contact with the ground, thus limiting and stopping the upward swing due to any hummock or elevation.

The vehicle to be equipped may be supplied with any suitable number of the traction elements or treads, as shown, in any suitable arrangement or combination.

Figure 3:
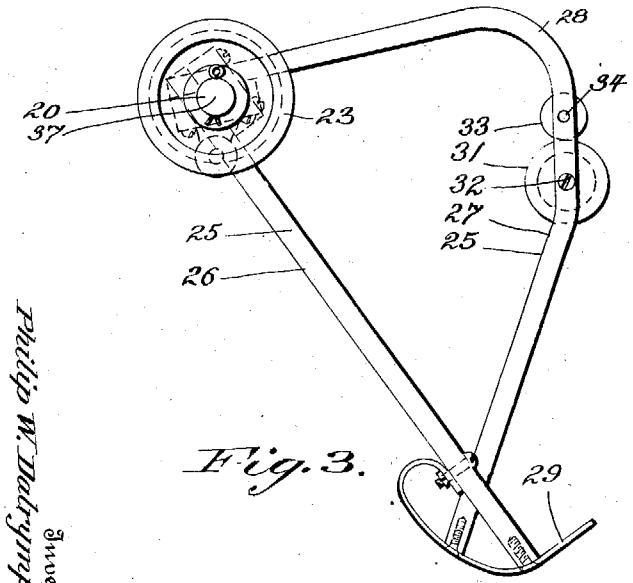
Fig. 3 is a side view of one of the legs or foot supporting frames detached.

In operation one or both of the shafts 14 carrying the sprockets 15, preferably the rear one, is driven by suitable connections, not shown, from a source of power carried by the vehicle. Rotation of the sprocket engaging the blocks or cross-bars 17 and 18, moves the chain or belt in counter-clockwise direction about the continuous tracks 1, causing the wheels 23 to roll in contact with this surface. This action imparts a corresponding traverse to the legs 25 with the feet 29 which are controlled as to their position relatively to their axes 37, see Fig. 3, by the tension or distributing belts or cables 35. These cables 35 are passed around the pulleys 30 on the shaft 20 and the pulleys 31 on the tangent portion of the supporting arms 27, engaging the outer surface, i. e., the surface remote from the frame of the pulleys 30 and the inner surface, i. e., the surface toward the frame of the pulleys 31, tend to swing the legs outward from the frame or track. This yielding or resilient tread of the feet 29 is accomplished in part by means of the continuous cables or belt 35 as follows:—In mounting and threading the cable or belt through the pulleys a sufficient amount of cable is allowed to give the flight of legs or feet the desired vertical motion, or arc of swing about their axis of rotation 20. This plus the proportional amount of elasticity of the cables, (which would be determined by the load or weight of the vehicle and the size of the cables), permits the flight of legs or feet to adapt themselves to practically all or any of the irregularities and variations of the ground, roadbed or supporting surface. Preferably the distributing belt 35 extends entirely around the track engaging the corresponding rollers on all the legs of one set or tread, through this might be differently arranged. As there is no resistance offered to the swing of the arms on the upper side of the track and the thrust or outward swinging tendency is uniform, the feet and legs take a uniform position relatively to the track as illustrated in Fig. 1 during the return stroke, but the important effect of this equalizing member takes place upon the working or supporting members of the series of feet. It being assumed that the surface, road or ground being traversed is uneven, such of the feet as register with them are free to settle down into hollows and others are placed upon the elevations or hummocks. The problem encountered is to make the bearing thrust uniform so that there is no considerable vibration or up and down motion of the machine, and no deep digging or indenting of the soil. The distribution of the weight carried or the weight of the machine with its load among the feet in position to bear upon the road surface, is due to the fact that all the feet are controlled by a member, the belt 35, which applies equal tension and thrust to each. When any foot encounters a slight elevation or hummock, it is forced upward relatively to the other feet and caused to rotate in lefthanded revolution about its axis, or more particularly, about the corresponding shaft 20. Such rotation swings the friction member or pulley on the leg upward transversely to the track and to the general tendency of the belt 35. This transverse motion, until it is equalized, causes a corresponding downward thrust on the other feet. This raises the vehicle very slightly as a result of the contact of one or more of the feet with the hummock suggested and causes it to move at an elevation corresponding, not to the raised or highest portions of the road being traversed, but to the average elevation. Otherwise described, the effect is that the vehicle carries a series or set of supports or trusses, each with a suitable foot supplying the necessary bearing power, and as it progresses, these trusses are set up on the ground to be traversed in such a way as to have the tops or supporting points of the trusses arranged substantially in a horizontal line. Each of these supporting members presents an anti-friction roller engaging the track 1, and the vehicle is carried in a line which corresponds in a general way only to the road contour by the contact of freely rotating rollers with a smooth track, so that we have the effect under all conditions of a vehicle moving by rolling contact on a track and this effect is produced even through the ground actually traversed is soft or broken, and wholly impassable by wheeled vehicles.

It will be particularly noted that the traction members 26 in all instances when the corresponding legs are performing the working or lower stroke, are turned backward in the direction from which the vehicle is moving, giving a traction or forward thrust directly from the corresponding follower to the ground while the corresponding supporting arm 27 is substantially vertical, transmitting its portion of the weight of the vehicle from the tension belt, direct to the road. As the tension of the belt must be uniform or nearly so, the supporting thrust of each foot in the working stroke must be nearly equal to that of the others. The upward or yielding swing of each leg is limited by the stop or guide 12, and its downward swing by the position of the equalizing belt 35 or rather the rollers 30. The rollers 33 act both as retainers for the belt 35 and as stops, the rollers 40 merely as retaining members. The frames or legs 25, the arms 27, the feet 29, and the allied parts, may be termed an endless flexible ground engaging element.

Considered in a broad sense, the invention may be said to comprise a vehicle suspension consisting of a rope or cable on which the weight of the vehicle is supported, with rope guides which support the rope at intervals, independently movable supports for said guides which transmit the weight of the vehicle to the ground, and guides which rest on the rope and transmit the weight of the vehicle thereto.

I have thus described specifically and in detail a single structure embodying my invention in order that its nature and operation may be clearly understood. However, the specific terms herein are used descriptively rather than in their limiting sense, and the scope of the invention is defined in the claims.

I claim:—

1. A belt tread consisting of a continuous track or guide, a series of followers on the track, a tension member connecting the followers, legs pivotally connected to the respective followers, a foot on each leg, and a flexible tension member engaging each leg at a point spaced from its pivot and likewise engaging the followers and applying an equal downward thrust to each foot of those engaging the surface being traversed, permitting the feet to conform to irregularities of said surface substantially without variation of thrust, and means for moving the connecting tension member and the track followers around the track.

2. A belt tread, consisting of a continuous track in a vertical plane, a series of followers spaced at intervals around the track, a continuous tension member connecting the followers, legs, each carrying a foot and connected to the respective followers to swing therefrom, each leg having engaging means spaced from its follower to be engaged by a tension member, the followers being provided with corresponding engaging means, and an equalizing tension member passed alternately around the engaging means on the followers and around the opposite side of the engaging means on the leg, applying substantially equal thrust to all legs engaging the surface being traversed without regard to the contour of said surface.

3. A belt tread, consisting of a continuous track in a vertical plane, a series of followers spaced at intervals around the track, a continuous tension member connecting the followers, legs, each carrying a foot and connected to the respective followers to swing therefrom, each leg having engaging means spaced from its follower to be engaged by a tension member, the followers being provided with corresponding engaging means, and an equalizing tension member passed alternately around the engaging means on the followers and around the opposite side of the engaging means on the leg, applying substantially equal thrust to all legs engaging the surface being traversed without regard to the contour of said surface, and means for limiting the swing of the legs.

4. In a tread, a series of feet, a separate leg for each foot, means for moving a single point on each leg on a continuous path, the legs being free to swing relatively to said path, and means for imparting uniform bearing pressure to all said feet which are in working position without regard to the contour of the surface traversed.

5. In a tread, a series of supporting frames or leg members, each carrying a foot at one extremity, means for moving one point on each said leg member in a continuous path relatively to which each leg is free to swing about said point, engaging means on each said leg spaced from said point by a suitable lever arm, the spacing being in an approximately horizontal direction in the instances of those feet which are in working position, a tension pulley for each foot, also moving in said path, and a flexible tension member for applying downward thrust to the feet which are in working position, making the bearing pressure of each foot on the road equal with regard to the contour of the road, said tension member being passed around the respective tension pulleys and alternately and oppositely around the engaging means on the swinging legs.

6. In a tread, a series of leg frames of substantially triangular outline, a pivot with guiding means near one extremity of each said frame, a foot near another extremity, means for moving the pivoted extremities on a continuous path, a tension pulley for each foot also moving in the same continuous path, an equalizing tension member, engaging means for said tension member on each said frame near the third extremity thereof, the tension member being passed over said means on each leg which is in working position and under the tension pulley in corresponding position, so that in the case of each leg in working position, a substantially direct downward thrust is imparted to the foot.

7. In a tread, a series of leg frames, the individual frames having a bearing on which they are mounted to swing, means carrying said bearing on a continuous path in a vertical plane, a foot for each leg, the leg frame including radially extending members for supporting the feet, and means also supporting the feet at an angle to said radial members and normally approaching the vertical when the corresponding foot is in operation, an anti-friction member on each said vertical member above the foot, an anti-friction member for each foot moving in a continuous path, a flexible tension member extending alternately around the anti-friction members in the continuous path, and the anti-friction members on the vertical members when the legs are in operation imparting an equal downward thrust to each foot in the bottom part of the path.

8. In a tread, a series of leg frames, the individual frames having a bearing on which they are mounted to swing, means carrying said bearing on a continuous path in a vertical plane, a foot for each leg, the leg frame including radially extending members for supporting the feet, and means also supporting the feet at an angle to said radial members and normally approaching the vertical when the corresponding foot is in operation, an anti-friction member on each said vertical member above the foot, an anti-friction member for each foot moving on a continuous path, a flexible tension member extending alternately around the anti-friction members in the continuous path, and the anti-friction members on the vertical members when the legs are in operation imparting an equal downward thrust to each foot in the bottom part of the path, permitting the feet to yield and change their relation substantially without change of thrust.

9. In a tread, a continuous guide or track, followers, and means for moving the followers about the track, legs carrying feet pivotally connected to the followers, each leg consisting of a traction member and a supporting member, anti-friction members carried by the supporting members of the legs, anti-friction members carried by the followers, and an equalizing tension member passed alternately and oppositely around the anti-friction members carried by the followers and the anti-friction members carried by the supporting members.

10. A tread consisting of a track or guide, followers on the track or guide and means for moving the followers along the same, legs carrying feet mounted on the followers to swing relatively thereto, the legs consisting of radial members sharply inclined during their operative traverse in the direction of motion of the followers relatively to the track, and supporting members which under the same conditions are substantially vertical, the traction members and supporting members converging near the feet, and means for applying substantially equal downward thrust to all the supporting members in the operative portion of the traverse and permitting them to yield to conform to irregularities of the road surface.

11. A belt tread consisting of a track or guide, followers on the track or guide and means for moving the followers along the same, legs carrying feet mounted on the followers to swing relatively thereto, the legs consisting of radial members sharply inclined during their operative traverse in the direction of motion of the followers relatively to the track, and supporting members which under the same conditions are substantially vertical, the traction members and supporting members converging near the feet, anti-friction means carried by some of the followers, anti-friction means carried by the supporting members, and a flexible tension member passed alternately and oppositely about the anti-friction means on the followers, and the anti-friction means on the supporting members applying uniform downward thrust to the supporting members of the legs in the operative traverse, permitting them to yield to comply to irregularities of the road surface without substantial variation of the bearing power of the feet.

12. In combination with a body to be supported; a series of thrust receiving elements underlying the same and movable towards and from the body; a series of pulleys associated and movable with said elements; a second series of body supporting pulleys spaced in alternation with those of the first series; and a flexible cable, passing in alternation over and under the pulleys whereby when thrust is applied to one or more of the thrust receiving elements, the cable will function to produce an equalizing movement in the others.

13. In combination with a body to be supported; a series of flexibly connected thrust receiving elements underlying and movable toward and from the same; a series of pulleys associated and movable with said elements; a second series of body supporting pulleys spaced in alternation with those of the first series; and a flexible cable, passing in alternation over and under the pulleys whereby when thrust is applied to one or more of the thrust receiving elements, the cable will function to produce an equalizing movement in the others.

14. In combination with a body to be supported; a series of thrust receiving elements underlying and movable toward and from the same; a series of pulleys associated and movable with said elements; a second series of pulleys spaced in alternation with those of the first series and fixed as to vertical movement with reference to the body when in active position; and a flexible cable, passing in alternation over and under the pulleys whereby when thrust is applied to one or more of the thrust receiving elements the cable will function to produce an equalizing movement in the others.

15. In combination with a body to be supported; a series of flexibly connected thrust receiving elements underlying and movable toward and from the same; a series of pulleys associated and movable with said elements; a second series of pulleys spaced in alternation with those of the first series and fixed as to vertical movement with reference to the body when in active position; and a flexible cable, passing in alternation over and under the pulleys whereby when thrust is applied to one or more of the thrust receiving elements the cable will function to produce an equalizing movement in the others.

16. The combination with a vehicle frame and an endless flexible ground engaging element mounted thereon, of an equalizing structure interposed between said frame and the ground engaging portion of said endless element and comprising a series of spaced pulleys in load supporting relation to said frame; a second series of pulleys alternating with the first, each pulley of the second series being movable independently of the others transversely to the first series and each such pulley being in load bearing relation to a corresponding portion of said endless element; and a cable passing sinuously over and under the alternating pulleys of the two series.

17. Suspension means for vehicles comprising rope-guiding pulleys mounted to turn about horizontal axes and on which the weight of the vehicle is carried, other rope-guiding pulleys mounted to turn about horizontal axes, individually movable supports for said pulleys which transmit the weight to the ground, and a body-supporting rope extending across said pulleys to yieldingly sustain the vehicle on said supports.

18. A vehicle suspension comprising a rope, guides below the rope for supporting it at different points, independently movable supports for said guides which move vertically to raise and lower the rope and transmit the weight of the vehicle from the rope to the ground, and rope guides alternating with those first mentioned arranged above and resting on the rope and which transmit the weight of the vehicle thereto.

19. A vehicle suspension comprising a rope, on which the weight of the vehicle is supported, rope guides which support the rope at intervals, independently movable supports for said guides which transmit the weight of the vehicle to the ground, and guides which rest on the rope and transmit the weight of the vehicle thereto.

20. A vehicle suspension comprising a rope on which the weight of the vehicle is supported, a plurality of rope guiding pulleys which support the rope at intervals, independently movable supports for said pulleys which transmit the weight of the vehicle to the ground, and rope guiding pulleys mounted to move about horizontal axes which rest on the rope and transmit the weight of the vehicle thereto.

PHILIP W. DALRYMPLE.